(12) United States Patent
Khatib

(10) Patent No.: US 11,951,630 B2
(45) Date of Patent: Apr. 9, 2024

(54) SYSTEMS AND METHODS FOR PROVIDING A CONTROL SOLUTION FOR AN ACTUATOR

(71) Applicant: THE BOARD OF TRUSTEES OF THE LELAND STANFORD JUNIOR UNIVERSITY, Stanford, CA (US)

(72) Inventor: Oussama Khatib, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 538 days.

(21) Appl. No.: 17/238,956

(22) Filed: Apr. 23, 2021

(65) Prior Publication Data
US 2021/0237272 A1 Aug. 5, 2021

Related U.S. Application Data

(62) Division of application No. 15/842,825, filed on Dec. 14, 2017, now Pat. No. 10,987,808.

(60) Provisional application No. 62/434,288, filed on Dec. 14, 2016.

(51) Int. Cl.
*B25J 9/16* (2006.01)
*B25J 13/02* (2006.01)

(52) U.S. Cl.
CPC ........... *B25J 9/1669* (2013.01); *B25J 9/1612* (2013.01); *B25J 13/025* (2013.01)

(58) Field of Classification Search
CPC ...... B25J 9/1669; B25J 9/1612; B25J 13/025; B25J 9/1689; G05B 2219/39505; G05B 2219/40271
See application file for complete search history.

(56) References Cited

U.S. PATENT DOCUMENTS

| | | | |
|---|---|---|---|
| 4,786,847 A | 11/1988 | Daggett et al. | |
| 10,987,808 B1 | 4/2021 | Khatib | |
| 11,334,069 B1* | 5/2022 | Buerger | H04L 41/046 |
| 2010/0087835 A1 | 4/2010 | Blumenkranz et al. | |
| 2010/0256814 A1 | 10/2010 | Smith | |
| 2012/0071752 A1 | 3/2012 | Sewell et al. | |
| 2014/0336669 A1 | 11/2014 | Park | |
| 2018/0200002 A1 | 7/2018 | Kostrzewski et al. | |
| 2019/0091861 A1* | 3/2019 | Kasai | G05B 13/048 |
| 2019/0176334 A1* | 6/2019 | Zhou | B25J 9/1689 |

(Continued)

OTHER PUBLICATIONS

Khatib, O., "A Unified Approach for Motion and Force Control of Robot Manipulators: The Operational Space Formulation," IEEE Journal of Robotics and Automation, RA-3(1):43-53, Feb. 1987.

(Continued)

*Primary Examiner* — Robert T Nguyen
(74) *Attorney, Agent, or Firm* — Kilpatrick Townsend & Stockton LLP; Kenneth Shurtz, Esq.

(57) ABSTRACT

Systems and methods of the present disclosure provide a control solution for a robotic actuator. The actuator can have one or two degrees of freedom of control, and can connect with a platform using an arm. The arm can have at least two degrees of freedom of control, and the platform can have at least two degrees of freedom of control. The platform can be subjected to unpredictable forces requiring a control response. The control solution can be generated using operational space control, using the degrees of freedom of the arm, platform and actuator.

22 Claims, 6 Drawing Sheets

(56) References Cited

U.S. PATENT DOCUMENTS

| | | | |
|---|---|---|---|
| 2019/0357988 A1 | 11/2019 | Abbott et al. | |
| 2020/0306998 A1* | 10/2020 | Talebi | B25J 19/002 |
| 2022/0134537 A1* | 5/2022 | Chadalavada Vijay Kumar | B25J 9/023 700/250 |
| 2023/0134924 A1* | 5/2023 | Sun | B25J 9/1697 700/259 |
| 2023/0381956 A1* | 11/2023 | Yue | G06F 17/16 |

OTHER PUBLICATIONS

U.S. Appl. No. 15/842,825, Non-Final Office Action dated Aug. 7, 2020, 8 pages.

U.S. Appl. No. 15/842,825, Notice of Allowance dated Dec. 21, 2020, 6 pages.

\* cited by examiner

SYSTEMS AND METHODS FOR PROVIDING A CONTROL SOLUTION FOR AN ACTUATOR

CROSS-REFERENCES TO RELATED APPLICATIONS

This application is a divisional of U.S. patent application Ser. No. 15/842,825, filed Dec. 14, 2017, which claims the benefit of U.S. Provisional Patent Application No. 62/434,288, filed Dec. 14, 2016, each of which is incorporated by reference herein in its entirety for all purposes.

FIELD OF THE DISCLOSURE

The present disclosure generally relates to generating control information for a robotic actuator, and providing a solution for generating the control information.

BACKGROUND OF THE INVENTION

A robotic actuator can be controlled to accomplish a task. The robotic actuator can be a part of a larger system that can have its own control. However, when the larger system is subjected to unpredictable forces, it can be challenging to provide a control solution for the actuator that can properly accomplish the task.

BRIEF SUMMARY OF THE INVENTION

Exploration in the ocean depths can benefit from human skills, expertise, and intelligence. However, it can be dangerous or impractical for divers to operate beyond fifty meters. Deeper dives can indicate greater expense and more complex precautions needed to safeguard human life, which can result in less time for divers to operate. In contrast, marine Remotely Operated Vehicles (ROVs) can perform deeper dives, but can possess limited manipulation abilities and can benefit from the attention of skilled pilots providing teleoperated control. ROVs can also have difficulty interacting gently with biological specimens and fragile artifacts, which can make their use in marine discovery and exploration challenging. What is needed to successfully perform deep dives is an ROV that can provide the manipulative skill, intuition and cognition of a human.

In unstructured environments, human reasoning can facilitate complex manipulation tasks. A robotic diver with a high degree of autonomy in physical interaction, such as Ocean One, a bimanual force-controlled humanoid robot that affords immediate and intuitive haptic interaction in oceanic environments developed at Stanford University of Palo Alto Calif., working with KAUST's Red Sea Research Center of Thuwal, Kingdom of Saudi Arabia and MEKA Robotics of San Francisco, Calif., when connected to a human expert through an intuitive interface, can provide this human reasoning to an ROV. A human can instruct Ocean One through high-level cognitive guidance, and can also intervene at any level of operation. The human operator can use a rich interface that can provide visual and haptic feedback together with a User Command Center (UCC) that can display data from other sensors and sources.

A tethered connection connecting the interface and the robot can risk entanglement, and can introduce disturbances. A relay station can facilitate connecting the interface and the robot through short-distance high-speed optical wireless links. In addition, the relay station can facilitate recharging the power for the robot close to the work area, and can free the robot for safer operation over a wider area. The relay station can also support a team of untethered robots, which can work with human divers.

Each arm of Ocean One can have seven joints, and can have an underactuated hand with one degree of freedom (DOF). The head can have two degrees of freedom (DOFs) of pan and tilt. The body can be actuated by eight thrusters, four on each side of the body. Four of the thrusters can control yaw motion and planar translations. The other four thrusters can control vertical translation, pitch and roll. The arrangement of these eight thrusters can provide redundancy that can allow full maneuverability in the event of a single thruster failure.

The system inertial properties of Ocean One reflected at the hand can have an upper bound of the inertial properties of the arm. This reduced effective inertia can be used in a macro-mini dynamic coordination to increase task responsiveness. The workspace and placement of the arms with respect to the body can be optimized to maximize the range over which the faster dynamics of the arms can be used to accommodate the slower dynamics of the body. As an example, in one embodiment, the robot can stabilize the task while the body is subject to large disturbance forces, such as sea currents, wind gusts, and so on. The macro-mini dynamic coordination can improve the ability of the robot to interact with its environment. As an example, in one embodiment, the robot in motion can execute a sequence that brings it to a stop by grasping a hand-hold with bothhands.

Ocean One can use a pair of 7-DOF compliant, electrically driven, torque-controlled arms with high torque capacities that can be adapted from a MEKA arm design. The arms can be fitted with series elastic actuators (SEAs) that can provide torque feedback, which can improve compliant motion, force control and safety for in-contact manipulation tasks. Low output impedance from the transmission can also reduce impact loads on both the environment and the manipulator during a collision. Low friction dynamic O-rings can be used at the output shaft of each link and can reduce transmission loss.

The hands of Ocean One can be gentle enough to handle organic samples, artifacts, and so on, and can be strong enough to hold tools securely, brace at handholds, be impact resilient, and so on. Compliant underactuated hands can be used to provide stability, adaptability, impact robustness, and so on.

The hands of Ocean One can use a single motor to drive three fingers, which can reduce weight, complexity, and so on. The motor can be housed in an oil-filled chamber with a single shaft seal, which can leave the fingers and tendons wet. The motor can drive a shaft with three spring-loaded pulleys that can wind the finger tendons. Soft transmission springs can be used to facilitate settling the fingers independently on irregular objects. A high transmission stiffness can facilitate tasks such as lifting heavy artifacts, extracting an object from sediment, and so on. The hands of Ocean One can determine the degree of load sharing between fingers by selecting between two transmission stiffnesses based on actuation direction. The hands can achieve a variety of common grasps, including wrapping on heavy frames and tools, more delicate pinching operations, and so on. A wide finger base can facilitate stabilizing long tools. Closing the hand with straight fingers can provide a parallel pinch of thin or small objects. If the proximal phalanges make contact with the sides of a large object, the fingertips can move past each other and can form an interlaced wrap grasp.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION OF THE INVENTION

Figure 1:
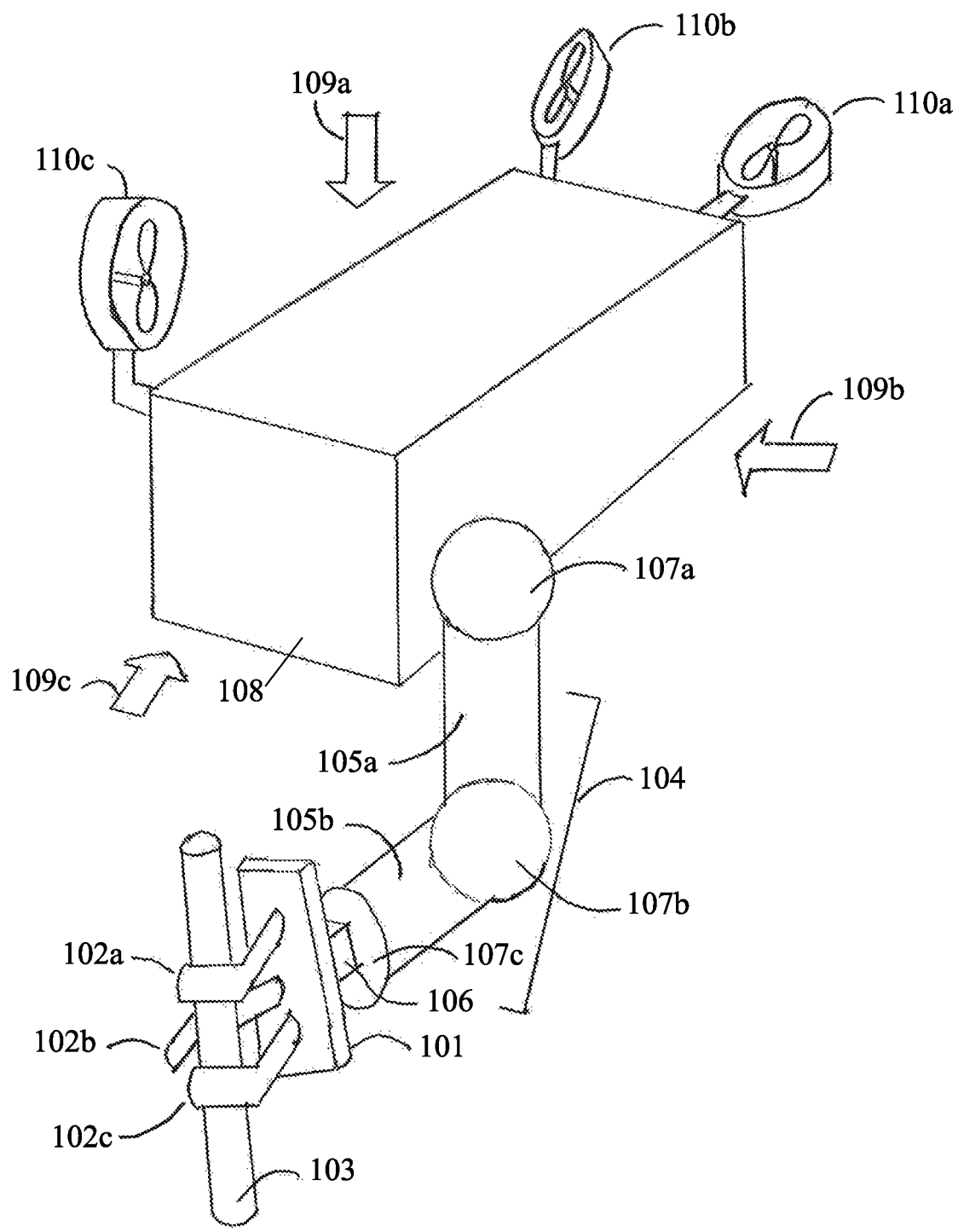
FIG. 1 is an illustrative block diagram of an embodiment of a system for providing a control solution for an actuator.

Systems and methods of the present disclosure can bring perception and action together in a multi-level structure as will be discussed more thoroughly in reference to FIG. 4. The whole-body control level can operate orders of magnitude faster than the elastic-planning and task-primitives level. The robot dynamics can be based on an operational space formulation, which can facilitate the whole-body controller realizing motion and multi-contact task objectives while handling constraints, avoiding collisions, and coordinating the body-arms motions using the macro-mini high-bandwidth control strategy. The real-time controller can operate with sensory feedback at a rate such as 1 kHz, which can provide responsive interactions with the environment. Interaction forces at the hands can be sensed through a 6-DOF force/torque sensor mounted at each wrist. Joint positions can be measured using optical encoders, and position and orientation of the body can be estimated using an inertial measurement unit (IMU), a depth sensor such as a Doppler velocity log (DVL), and so on.

The whole-body controller can use task objectives generated through the elastic planning and task-primitive module. Elastic planning can provide real-time path modification in response to unforeseen changes in the environment. The task primitive module can provide a library of basic actions which can implement an abstraction of the robot's manipulation skills. The task primitive module can use local and global models of the robot and its environment, which can be maintained using on-board sensors, cameras, and so on.

A human user can interact with the robot and can intervene at multiple levels of task abstraction. Haptic devices can output interaction forces to the whole-body controller. The robot can mimic the motion of the human's hands using the robot hands. The senses of the robot can be shared with the human, so that the human can see the output of the robot cameras, and the human can feel the output of the robot force sensors. The robot can autonomously execute a plan specified by the human operator using the elastic planning and task primitive module. The interface between the human and the robot can be transparent even with communication delays that can result from remote operation. High fidelity haptic feedback can be provided to the human using devices such as the sigma.7 haptic interface from Force Dimension of Nyon, Switzerland. The human can be visually immersed in the scene through a pair of binocular-stereo feeds that can be presented on a passive 3D display. A wide-angle body-mounted camera can provide an additional view of the workspace.

The key ingredients to the success of a robot in accomplishing challenging manipulation tasks in inhospitable environments can be whole-body control and interaction skills of the robot that can be balanced with expertise of a human, and the haptic-visual interface which can bring a heightened sense of presence. These capabilities can enable tasks such as coral reef monitoring, underwater pipeline maintenance, mining, searching for and acquiring materials, maintaining support equipment at remote sites, building infrastructure for monitoring the environment, performing disaster prevention and recovery operations, and so on, in environments such as the deep ocean, mines, mountain tops, outer space, and so on.

At least one aspect of the present disclosure is directed to a method of providing a control solution for an actuator. The method can include providing the actuator with 1 or 2 degrees of freedom of control. The method can include connecting the actuator with a platform using an arm. The method can include providing the arm with at least 2 degrees of freedom of control. The method can include providing the platform with at least 2 degrees of freedom of control. The method can include generating the control solution using the degrees of freedom of the arm, platform, and actuator. The platform can be subjected to unpredictable forces requiring a control response. The control solution can be generated using operational space control.

In some embodiments, the platform can be an underwater platform. The unpredictable forces can be currents in the water.

In some embodiments, the combination of the platform, the arm, and the actuator can be an over-constrained system.

In some embodiments, the arm can include a first joint connecting the arm to the platform, a second joint connecting the arm to the actuator, and a third joint between the first joint and the second joint.

In some embodiments, the unpredictable forces can be interactions with the environment of the platform.

In some embodiments, the control solution can be generated repetitively at an operational frequency.

At least one aspect of the present disclosure is directed to a method of providing a control solution for an actuator. The method can include receiving a desired control force from a haptic device. The method can include generating the control solution corresponding to the desired control force. The method can include applying the control solution to the actuator. The method can include measuring feedback force on the actuator. The method can include applying the feedback force to the haptic device. The control solution can be generated using operational space control.

In some embodiments, the haptic device can be remote from the actuator. The desired control force can be transmitted from the haptic device to the actuator. The feedback force can be transmitted from the actuator to the haptic device In some embodiments, the control solution can be generated repetitively at an operational frequency.

At least one aspect of the present disclosure is directed to a method of providing a control solution for an actuator. The method can include receiving desired action information from a haptic device at a first rate. The method can include generating elastic planning using desired action information and multi-resolution models at a second rate. The method can include generating the control solution using the elastic planning and sensing information at a third rate. The method can include applying the control solution to the actuator. The method can include measuring force at the actuator at the third rate. The method can include generating sensing information using the force and position measurements at the third rate. The method can include generating multi-resolution models using the sensing information at the second rate. The method can include generating perception information using the multi-resolution models at the first rate. The method can include providing the perception information to an output device at the first rate. The third rate can be higher than the second rate. The second rate can be higher than the first rate.

In some embodiments, the control solution can be generated using operational space control.

In some embodiments, the method can include generating task primitives based on desired action information and multi-resolution models at the second rate. In some embodiments, the method can include measuring position at the actuator at the third rate. In some embodiments, the method can include estimating additional parameters using the force and position measurements at the third rate. In some embodiments, the method can include using the task primitives and the additional parameters to generate the control solution at the third rate.

In some embodiments, the perception information can be force feedback.

In some embodiments, the perception information can be display feedback.

In some embodiments, the perception information can be range information.

At least one aspect of the present disclosure is directed to a system of an actuator. The system can include a first finger with at least a first segment and a second segment connected by a first joint. The system can include a second finger with at least a third segment and a fourth segment connected by a second joint. The system can include an effector that moves the first finger and the second finger toward contact. The first finger and the second finger can be configured to hold a first object between the second segment and the fourth segment with the first joint and the second joint remaining straight, or grasp a second object between the first segment and the third segment with the first joint and the second joint bending in opposite directions to each other.

Turning to the drawings, FIG. 1 is an illustrative block diagram of an embodiment of a system for providing a control solution for an actuator. The actuator 101 can have three fingers 102a-102c that can grasp an object 103. The actuator 101 can be connected to an arm 104 through a connector 106. The arm 104 can include two segments 105a-105b, and three joints 107a-107c. Joint 107a can act as a shoulder, joint 107b can act as an elbow, and joint 107c can act as a wrist. The wrist joint 107c can connect to the actuator 101 through the connector 106. The shoulder joint 107a can be connected to a platform 108. Segment 105a can connect joint 107a and joint 107b, and segment 105b can connect joint 107b and joint 107c.

The platform 108 can be connected to actuators 110a-110c, which can control the pitch and yaw of platform 108. The position of the actuator 101 can be determined by the combination of the position of the platform 108 and the position of the arm 104, which in turn can be determined by the control provided by the actuators 110a-110c and the actuators for the joints 107a-107c.

The platform 108 can be subject to external forces 109a-109c, which can be unpredictable. The forces 109a-109c can be unpredictable as a result of the interaction between the platform 108 and the environment around the platform 108. The forces 109a-109c can also act on the arm 104, the actuator 101, objects 103 in the environment, and so on. The control of the actuators 110a-110c and the actuators for the joints 107a-107c can be used to maintain a stable position and attitude for the actuator 101 by compensating for the forces 109a-109c. This can facilitate using the fingers 102a-102c to grasp object 103 steadily and reliably.

In one embodiment, the control for actuators 110a-110c and the actuators for joints 107a-107c can be computed using inverse kinematics. In another embodiment, the control for actuators 110a-110c and the actuators for joints 107a-107c can be computed using operational space control as described more fully with respect to FIGS. 2A-2F. The solution computed using operational space control can be more effective for stabilizing the actuator 101 than the solution computed using inverse kinematics. The solution computed using operational space control can be more effective when the overall system with the platform, arm, and actuator is an over-constrained system as described more fully with respect to FIGS. 2G-2H. The solution can be computed repetitively at an operational frequency, such as 1 kHz, for a solution computed with either inverse kinematics or operational space control.

In one embodiment, the entire system depicted in FIG. 1 can be operating underwater. The forces 109a-109c can be the result of underwater currents, which can make them unpredictable.

The one or more components 108, 104, 101, 301, 304-308, 401-404, and 413-414 associated with the system for providing a control solution for an actuator can contain computers that can contain processors. The computers do not need to be physically proximate to each other or in the same machine farm. Thus, the computers logically grouped as a machine farm can be interconnected using a local-area network (LAN) connection or a wide-area network (WAN) connection (e.g., such as the Internet or a metropolitan-area network (MAN) connection). For example, a machine farm can include computers physically located in different continents or different regions of a continent, country, state, city, campus, or room. Data transmission speeds between computers in the machine farm can be increased if the computers are connected using a LAN connection or some form of direct connection.

Management of the computers can be de-centralized. For example, one or more computers can comprise components, subsystems and circuits to support one or more management services. In one of these embodiments, one or more computers provide functionality for management of dynamic data, including techniques for handling failover, data replication, and increasing robustness. Each computer can communicate with a persistent store and, in some embodiments, with a dynamic store.

A computer can include a file server, application server, web server, proxy server, appliance, network appliance, gateway, gateway, gateway server, virtualization server, deployment server, secure sockets layer virtual private network ("SSL VPN") server, or firewall. In one embodiment, the computer can be referred to as a remote machine or a node. In one embodiment, the computer can be referred to as a cloud.

The system and its components, such as 108, 104,101, 301, 304-308, 401-404, and 413-414, can include hardware elements, such as one or more processors, logic devices, or circuits. For example, the system and its components can include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system can further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as 108, 104,101, 301, 304-308, 401-404, and 413-414, can include, e.g., computing devices, desktop computers, laptop computers, notebook computers, mobile or portable computing devices, tablet computers, smartphones, personal digital assistants, or any other computing device.

Figure 2A:
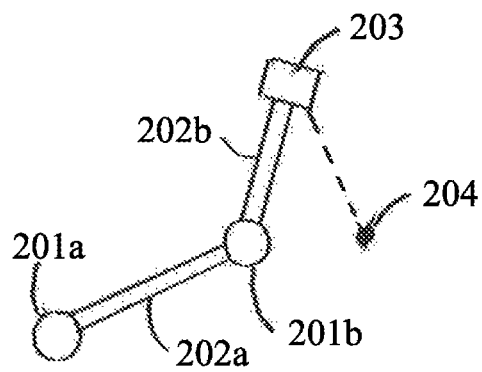
FIGS. 2A-2B are illustrative block diagrams of an embodiment of an actuator completing a task.
Figure 2B:
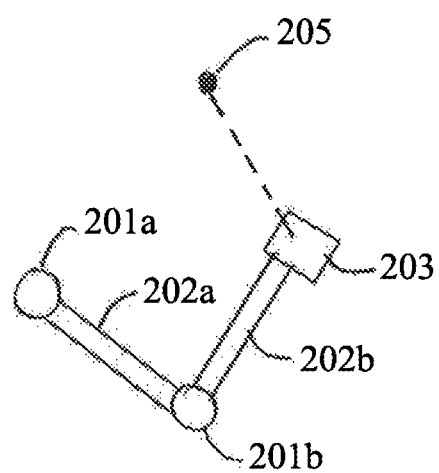

FIGS. 2A-2B are illustrative block diagrams of an embodiment of an actuator completing a task. The drawings in FIGS. 2A-2H are not limiting and can provide examples to demonstrate and compare control using inverse kinematics and operational space control. The examples are drawn in two dimensions to simplify the example, but the principles demonstrated can apply equally well in three dimensions. The actuator can consist of two joints 201a and 201b, and endpoint 203. Segment 202a can connect joint 201a and joint 201b, and segment 202b can connect joint 201b and endpoint 203. The task can be to move endpoint 203 from starting position 205 to ending position 204. FIG. 2A depicts the starting position of the actuator, and FIG. 2B depicts the ending position of the actuator. The problem to be solved can be to find a solution to how to move the joints 201a-201b to execute this task.

Figure 2C:
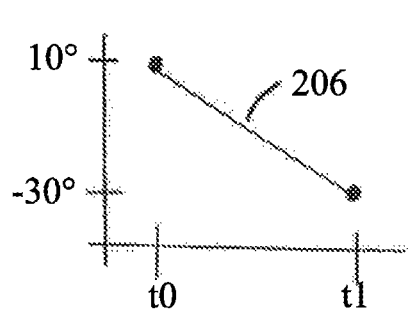
FIG. 2C is an illustrative graph of an embodiment of a control solution for an actuator completing a task.
Figure 2C:
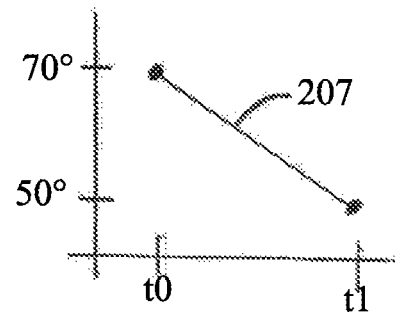

FIG. 2C is an illustrative graph of an embodiment of a control solution for an actuator completing a task. Continuing the example, the graphs in FIG. 2C can show how inverse kinematics can be used to find the solution for the task. The forward kinematic equation can describe the location of the endpoint 203 as a function of the joint angles for joints 201a and 201b. The inverse of that equation can then be used to solve for the joint angles for joints 201a and 201b for both the starting position 205 and the ending position 204. In the example depicted in FIG. 2C, the graph on the left corresponds to the joint angle for joint 201a, and shows that the joint angle can be 10 degrees at the starting position 205 and −30 degrees at the ending position 204. The graph on the right corresponds to the joint angle for joint 201b, and shows that the joint angle can be 70 degrees at the starting position 205 and 50 degrees at the ending position 204. The inverse kinematic solution for the task can then be to move from the starting position 205 at time t0 to the ending position 204 at time ti with a linear change 206 of the joint angle for joint 201a, as depicted in the left graph, and a linear change 207 of the joint angle for joint 201b, as depicted in the right graph.

Figure 2D:
FIG. 2D is an illustrative block diagram of an embodiment of the result of applying a control solution to an actuator.

FIG. 2D is an illustrative block diagram of an embodiment of the result of applying a control solution to an actuator. Continuing the example, FIG. 2D shows how the endpoint 203 can move when the joint angles depicted in FIG. 2C are applied to the actuator depicted in FIGS. 2A-2B. The line 208 shows the path the endpoint 203 can take moving from the starting position 205 to the ending position 204. In the example depicted in FIG. 2D, the path 208 is a curved path. The linear changes to joint positions depicted in FIG. 2C can result in a path 208 that is not straight.

Figure 2E:
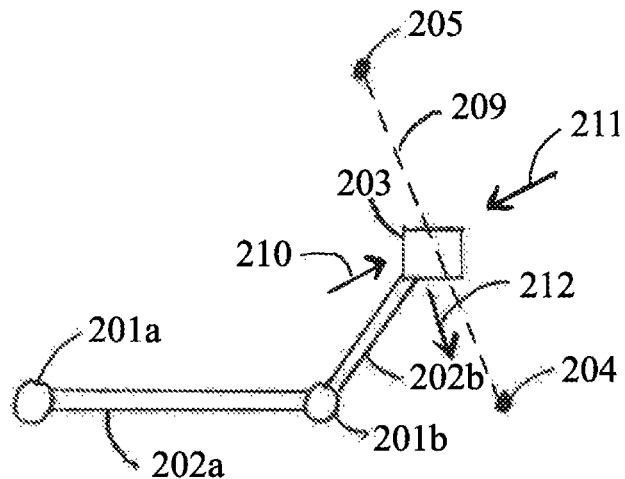
FIG. 2E is an illustrative block diagram of an embodiment of an actuator applying a control solution.

FIG. 2E is an illustrative block diagram of an embodiment of an actuator applying a control solution. Continuing the example, the path 208 provided by the inverse kinematic solution can be undesirable. For example, a straight path can be desired, the forces on the endpoint 203 can exceed a desired maximum, the required forces on the joints 201a-201b can exceed a desired maximum, and so on. FIG. 2E depicts an operational space solution that uses a potential field to arrive at a solution that can provide a straight path 209 between the starting point 205 and the ending point 204. In this solution, imaginary forces 210-211 can act on the endpoint 203. These forces 210-211 can be small near the desired path 209 and can increase further away from the path 209. In this way, a potential field (not shown) can be created around the path 209 that can tend to "push" the endpoint 203 toward the path. An additional imaginary force 212 can be provided that is in the direction of the endpoint 204. In this way, another potential field (not shown) can be created around the endpoint 204 that can tend to "push" the endpoint 203 toward its goal 204.

With the imaginary forces 210-212 in place, the operational space solution can be found by applying these forces to the endpoint 203, transferring the forces along the segments 202a-202b to the joints 201a-201b, and using the equation of motion (a F/m) to determine the change in the joint angles for joints 201a-201b for a small period of time. This calculation can be repeated for a series of small time periods to provide the overall solution moving the endpoint 203 from the starting position 205 to the ending position 204.

Figure 2F:
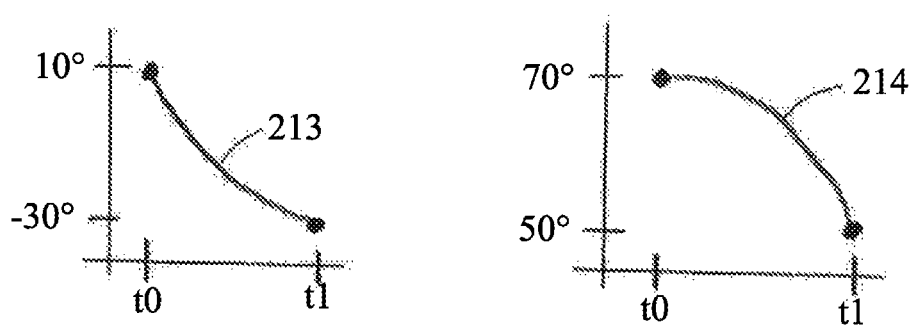
FIG. 2F is an illustrative graph of an embodiment of a control solution for an actuator completing a task.

FIG. 2F is an illustrative graph of an embodiment of a control solution for an actuator completing a task. Continuing the example, the graphs in FIG. 2F can correspond to the graphs described in reference to FIG. 2C, but for the operational space control solution described in reference to FIG. 2E. The change 213 of the joint angle for joint 201a depicted in the left graph can be nonlinear, and the change 214 of the joint angle for joint 201b depicted in the right graph can be nonlinear. The changes 213-214 in the joint angles for joints 201a-201b can represent the operational space solution for the task described previously in reference to FIGS. 2A-2B.

Figure 3A:
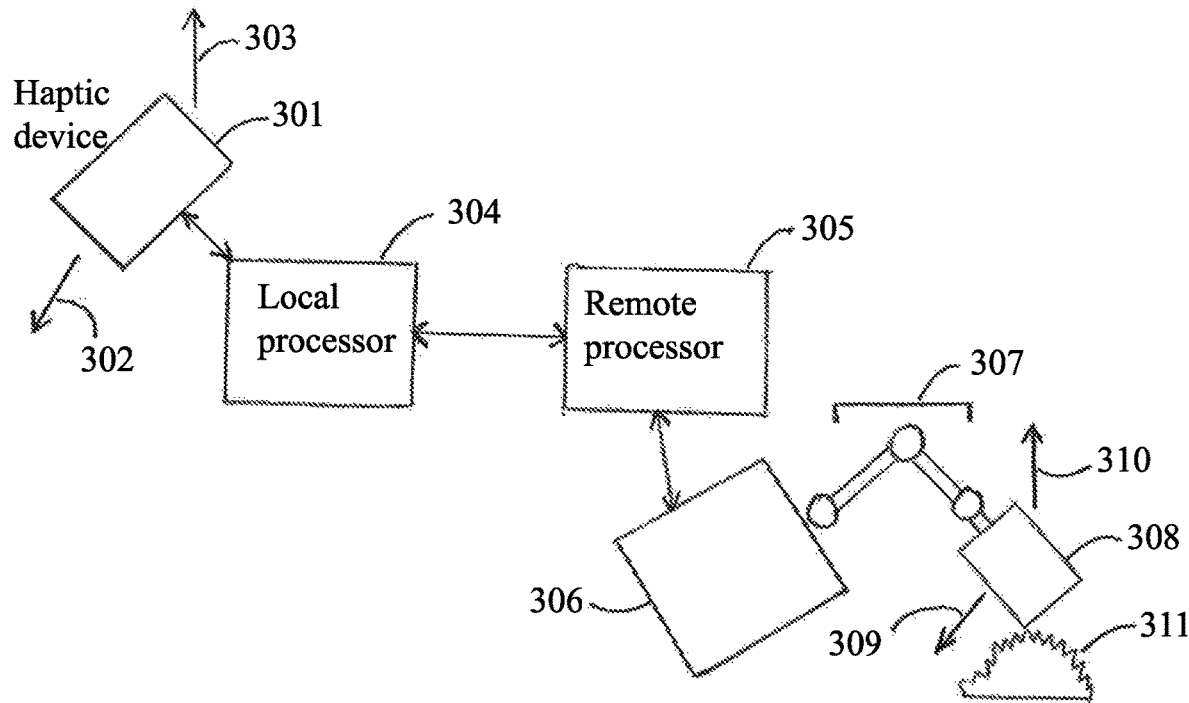
FIGS. 3A-3B are illustrative block diagrams of an embodiment of a system for providing a control solution for an actuator based on a control force from a haptic device.
Figure 3B:
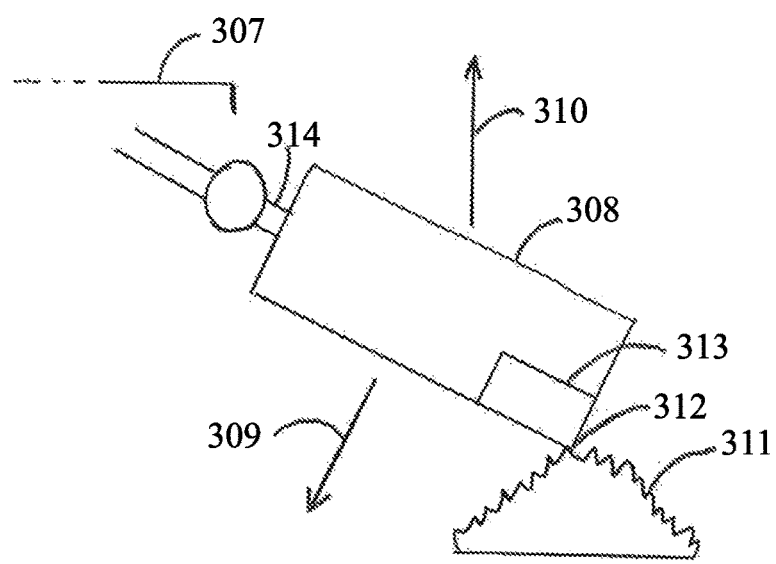

FIGS. 3A-3B are illustrative block diagrams of an embodiment of a system for providing a control solution for an actuator based on a control force from a haptic device. Haptic device 301 can have a force 302 applied, which can indicate a desired operation of a remote actuator 308. The force 302 can be received by a local processor 304 and can be used to generate a result that can be transmitted to a remote processor 305. The remote processor 305 can generate a solution for the task of applying the force 309 to the actuator 308, which can be done using the methods described with respect to FIGS. 2A-2H. The actuator 308 can be part of a system that can include a platform 306 and an arm 307, as previously described with respect to FIG. 1.

While applying the solution to the actuator 308, the environment can exert a force 310 on the actuator. In an illustrative example, the actuator 308 can collide with an object 311 at a collision point 312 and generate a force 310. This force 310 can be measured directly with a detector 313 in the actuator 308, it can be inferred from force measurements in the connector 314 between the arm 307 and the actuator 308, or it can be measured in any other way. The force 310 can be received by the remote processor 305, which can in turn generate a result and transmit it to the local processor 304. The local processor 304 can use this result to apply a corresponding feedback force 303 to the haptic device 301, which can close the loop between the haptic device 301 and the actuator 308. The application of the feedback force 303 can be updated repetitively at an operational frequency, such as 1 kHz. The remote processor 305 can be physically separate from the local processor 304, and can be connected using a network.

The network can include a LAN, MAN, and WAN. In some embodiments, there are multiple networks between the devices and the computers. In one of these embodiments, the network can be a public network, a private network, or can include combinations of public and private networks.

The network can be any type or form of network and can include one or more of the following: a point-to-point network, a broadcast network, a wide area network, a local area network, a telecommunications network, a data communication network, a computer network, an ATM (Asynchronous Transfer Mode) network, a SON ET (Synchronous Optical Network) network, a SDH (Synchronous Digital Hierarchy) network, a wireless network and a wireline network. In some embodiments, the network can include a wireless link, such as a visible light channel, an infrared channel or satellite band. The network can be designed to operate underwater or underground. The topology of the network can include a bus, star, or ring network topology. The network can include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data can be transmitted via different protocols. In other embodiments, the same types of data can be transmitted via different protocols.

Figure 4:
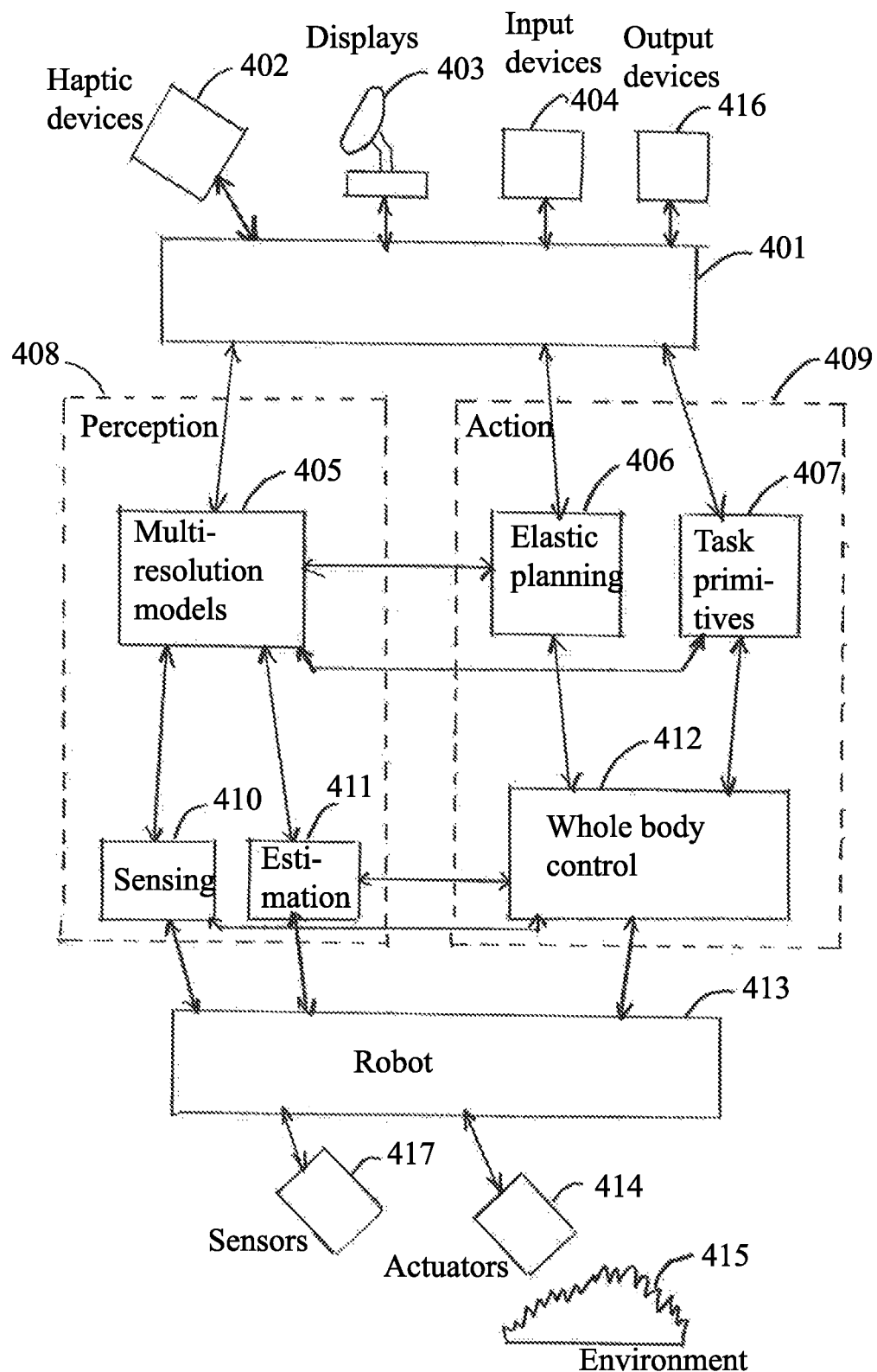
FIG. 4 is an illustrative block diagram of an embodiment of a system for providing a control solution for an actuator.

FIG. 4 is an illustrative block diagram of an embodiment of a system for providing a control solution for an actuator. Interface module 401 can receive input from haptic device 402 and other input devices 404. The input can be processed and the result can be used by elastic planning module 406. Task primitives 407 can be created by elastic planning module 406 or from the result from interface 401. The elastic planning module can use operational space control as described with respect to FIGS. 2A-2H to create task primitives 407 and to directly generate solutions for whole body control 412 based on inputs from the interface module 401. The elastic planning module 406 and task primitives 407 can use state information from multi-resolution modules 405 to create task primitives and generate solutions for whole body control 412. The whole body control module 412 can use sensing information 410 and output from the estimation module 411 along with task primitives 407 and solutions from the elastic planning module 406 to generate actuator control information for the robot 413. The combination of the elastic planning module 406, task primitives 407, and whole body control module 412 can make up action processing 409.

As an illustrative example embodiment, the elastic planning module 406 can implement real time planning that can update paths based on unforeseen changes in the environment 415. For example, the elastic planning module 406 can receive multi-resolution three-dimensional models 405 of the platform 108, the actuators 110a-110c, the arm 104, the actuator 101, the fingers 102a-102c, and objects 103 in the environment 415, along with the connectivity of the models, the position of the models, the forces measured on the models, and so on. The elastic planning module 406 can receive desired forces, motions, positions, orientations, actions such as grasping, and so on, from the interface module 401. The elastic planning module 406 can create task primitives 407 using these inputs, and can provide control solutions for whole body control 412, which can be provided using operational space planning, and can integrate real time updates from the multi-resolution models 405. The whole body control module 412 can receive these control solutions from the elastic planning module 406, and can integrate them with task primitives 407 and estimates from the estimation module 411 of the positions, orientations, forces, and so on associated with the robot 413, and can use these inputs to provide actuator control information for the actuators 414. For example, a strong current 109c that is pushing the platform 108 further away from the object 103 can appear as a force in a model 405 for the platform 108. The elastic planning module 406 can use operational space planning with a goal of maintaining the position of the actuator 101 so as to keep the object 103 in the same position and not apply additional forces to it. The models 405 of the arm 104, actuator 101, object 103, and platform 108 can be inputs to this planning and can generate a task primitive 407 to move the joints 107a-107c of the arm 104, along with a control solution that can extend the arm 104 to compensate for the movement of the platform 108, and a control solution that can activate the actuators 110a-110c to counteract the current 109c and move the platform back toward its original position. These control solutions can be adjusted using the estimate of the current position of the platform 108 and object 103, and can be provided to the robot 413 to send to the actuators 414 to flex the arm 104 outward and keep the actuator 101 in the same position relative to the object 103, even though the current 109c may be moving the platform 108, and also to use the actuators 110a-110c to slow and reverse the movement of the platform 108.

The robot 414 can apply the actuator control information from the whole body control module 412 to one or more actuators 414. The actuators can interact with the environment 415 of the robot, and can receive information about the environment 415 from the actuators 414 and one or more sensors 417. This information can serve as sensing information 410 and can be used by an estimation module 411 to estimate the position and orientation of the robot 413 along with the actuators 414 and sensors 417. The sensing information 410 and results from the estimation module 411 can be used by the whole body control 412 to update the actuator control information, and can be used to update multi-resolution models 405 of the robot 413 and its environment 415. The multi-resolution models 405 can provide local and global models that can be updated using the sensing information 410 and results of the estimation module 411, and can be used by the elastic planning module 406 and task primitives 407 to update the real time planning previously discussed. The combination of sensing information 410, estimation module 411, and multi-resolution models 405 can make up perception processing 408.

As an illustrative example embodiment, the sensors 417 can be measuring force and acceleration of the actuator 101 and the fingers 102a-102c. Currents in the water can extert forces 109a-109c that can move the entire system, which can include the platform 108, the arm 104, the actuator 101, the object 103 in the environment 415, and so on, all in the same direction at the same time. The acceleration from the sensors 417 can be recorded as sensory information 410 and can be used by the estimation module 411 to estimate updated positions of elements in the system. The sensory information 410 and estimates from the estimation module 411 can provide information to update the multi-resolution three-dimensional models 405 as described previously. In this case, the movement of the entire system as a result of a large current can be of no relevance to the operation of the robot, so it can be eliminated from the models 405. Information from the models 405 can be provided to the interface module 401 which can provide forces to the haptic devices 402 and updated three-dimensional displays 403. Since the overall large force of the current that moves the entire system can be eliminated, the forces on the haptic devices 402 can omit the redundant and possibly confusing force from the large current, which can facilitate the fine control of the main task, and the overall movement can be eliminated from the display 403, which can reduce the possibility of inducing seasickness in the operator.

The multi-resolution models 405 can also be used by the interface module to present information about the robot 413 and its environment 415 through the haptic devices 402, displays 403, and other output devices 416. Example embodiments of the haptic devices and displays have be discussed previously. Other example embodiments of output devices can include low-level information directly from the sensors, an overview of the robot and its environment 415, path planning information from the elastic planning module 406, scheduled task primitives 407, illustrative graphs of forces on the system components over time, rendering of the multi-resolution models 405 from various viewpoints, acoustic information from microphones, acoustic information from sonar, and so on.

In one embodiment, the activities depicted in FIG. 4 do not all need to happen at the same rate. The activities involving the robot 413, sensors 417, actuators 414, sensory data 410, estimation module 411, and whole body control module 412 can all happen at the highest rate, for example 1 kHz, in order to provide accurate and responsive control of the robot 413. The activities involving the elastic planning module 406, task primitives 407, and multi-resolution models 405, can happen at a slower rate, for example 1/10 the initial rate, for example at 100 Hz, which can reduce the processing power required. The activities involving the interface module 401 and input/output devices 402-404 and 416 can happen at a slower rate, for example 1/100 the initial rate, for example at 10 Hz, which can represent the fact that these activities involve interactions with human beings. Note that the low level implementation of the input/output devices 402-404 and 416 can happen at a higher rate than 10 Hz in order to provide realistic and natural responses to humans, but the data used by the interface module 401 can be processed at the slower rate.

Figure 5A:
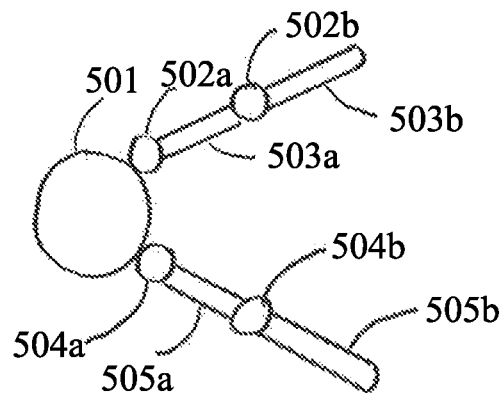
FIGS. 5A-5C are illustrative block diagrams of an embodiment of an actuator.
Figure 5B:
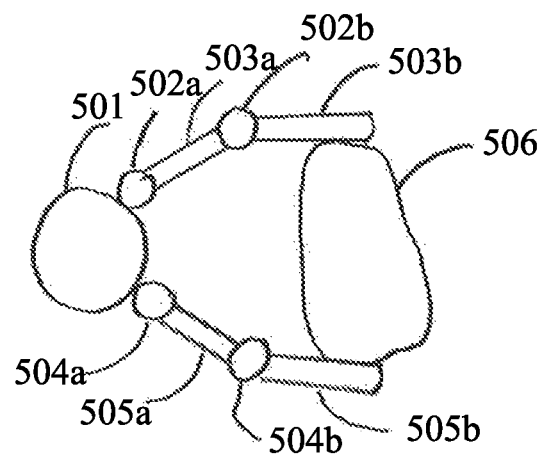
Figure 5C:
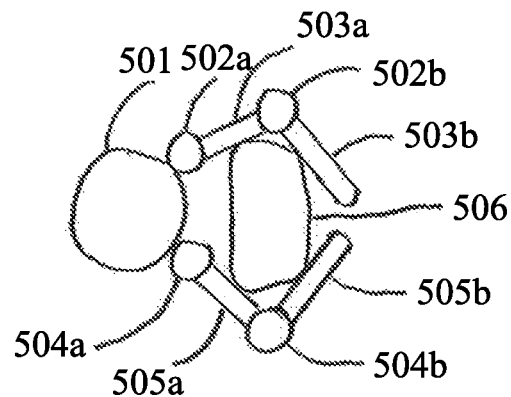

FIGS. 5A-5C are illustrative block diagrams of an embodiment of an actuator.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement can also be employed to execute the instructions contained in memory. In alternative embodiments, hard-wired circuitry can be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various implementations are described herein, generally, as one or more processors, systems, servers, computers, circuits, software, memory, and/or combinations of these things. Generally speaking, any functions and/or processes described herein can be implemented in one or more of these forms. "Circuitry" can refer to dedicate logic gates, arranged so as to necessarily perform a certain function, or as general purpose circuitry (e.g., a processor, FPGA or other configurable circuits) that are controlled or configured by instructions to adapt that circuitry to perform a specific function. In the case of software or other instructional logic, the instructions are typically written or designed in a manner that has certain structure (architectural features) such that, when those instructions are ultimately executed, they cause the one or more general purpose circuits or hardware devices to necessarily perform certain described tasks. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions can subsequently be retrieved by a machine. The machine-readable media can be in standalone form (e.g., a program disk, whether bootable or executable or otherwise) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, in one implementation, instructions on non-transitory machine-readable media can be executed by a single computer and, in other cases as noted, can be stored and/or executed on a distributed basis, e.g., using one or more servers, web clients, or application-specific devices, whether collocated or remote from each other. Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices. Throughout this disclosure, various processes have been described, any of which can generally be implemented as instructional logic (e.g., as instructions stored on non-transitory machine-readable media), as hardware logic, or as a combination of these things.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

References to "or" can be construed as inclusive so that any terms described using "or" can indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing can be advantageous.

While this specification contains many specific implementation details, these should not be construed as limitations on the scope of any inventions or of what can be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. A method of providing a control solution for an actuator of a system, comprising:
   receiving, with a controller of the system, a first model of the actuator;
   receiving a second model of an arm;
   receiving a third model of a mobile platform; and
   generating, based on the first model, the second model, and the third model, the control solution;
   wherein:
   the arm is connected to the platform and to the actuator;
   the platform is subjected to at least one unpredictable force; and
   the generating of the control solution uses operational space control.

2. The method of claim 1, wherein:
   the platform is an underwater platform; and
   the at least one unpredictable force is an underwater current.

3. The method of claim 1, wherein:
   the actuator, the arm, and the platform define an over-constrained system.

4. The method of claim 1, wherein the arm comprises:
   a first joint between the arm and the platform;
   a second joint between the arm and the actuator; and
   a third joint between the first joint and the second joint.

5. The method of claim 1, wherein the actuator is a robotic actuator for effecting a manipulation task commanded by a user at a control device.

6. The method of claim 5, wherein the control solution controls the robotic actuator and the first, second and third joint so as to effect the manipulator task while the platform is subjected to at least one unpredictable force.

7. The method of claim 6, further comprising:
   receiving a fourth model of one or more stability actuators connected to the platform;
   wherein the control solution is further based on the fourth model.

8. The method of claim 7, wherein the control solution controls the one or more stability actuators to stabilize the platform so as to effect the manipulation task while the platform is subjected to at least one unpredictable force.

9. The method of claim 7, further comprising:
   receiving a fifth model of an object in the environment being manipulated by the manipulation task;
   wherein the control solution is further based on the fifth model to facilitate the manipulation task.

10. The method of claim 1, wherein each of first, second and third models is a multi-resolution three-dimensional model.

11. The method of claim 1,
    wherein the actuator comprises at least one degree of freedom;
    wherein the arm comprising at least two degrees of freedom; and
    wherein the platform comprises at least two degrees of freedom.

12. A system for providing a control solution, comprising:
    an actuator;
    an arm;
    a mobile platform; and
    one or more processors with a memory having instructions thereon configured to:
      receive a first model of the actuator, a second model of the arm, and a third model of the platform; and
      generate, based on the first model, the second model, and the third model, the control solution for the platform, the arm, and the actuator using operational space control;
    wherein:
    the arm is connected to the platform and to the actuator;
    the platform is subjected to at least one unpredictable force; and
    the one or more processors generate the control solution using operational space control.

13. The system of claim 12, wherein:
    the platform is an underwater platform; and the at least one unpredictable force is an underwater current.

14. The system of claim 12, wherein:
the actuator, the arm, and the platform define an over-constrained system.

15. The system of claim 12, wherein the arm comprises:
a first joint between the arm and the platform;
a second joint between the arm and the actuator; and
a third joint between the first joint and the second joint.

16. The system of claim 12, wherein the actuator is a robotic actuator configured for effecting a manipulation task commanded by a user at a control device.

17. The system of claim 16, wherein the control solution controls the robotic actuator and the first, second and third joint so as to effect the manipulator task while the platform is subjected to at least one unpredictable force.

18. The system of claim 17, further comprising:
receiving a fourth model of one or more stability actuators connected to the platform;
wherein the control solution is further based on the fourth model.

19. The system of claim 18, wherein the control solution controls the one or more stability actuators to stabilize the platform so as to effect the manipulation task while the platform is subjected to at least one unpredictable force.

20. The system of claim 18, further comprising:
receiving a fifth model of an object in the environment being manipulated by the manipulation task; wherein the control solution is further based on the fifth model to facilitate the manipulation task.

21. The system of claim 12, wherein each of first, second and third models is a multi-resolution three-dimensional model.

22. The system of claim 12,
wherein the actuator comprises at least one degree of freedom;
wherein the arm comprising at least two degrees of freedom; and
wherein the platform comprises at least two degrees of freedom.

* * * * *